US009922494B2

(12) United States Patent
Mound (10) Patent No.: US 9,922,494 B2
(45) Date of Patent: *Mar. 20, 2018

(54) SYSTEM AND METHOD FOR SELECTING GAME PLAYERS FROM MULTIPLE AUTHORIZED LOCATIONS TO COMPETE IN A GAME SHOW

(71) Applicant: Scientific Games International, Inc., Newark, DE (US)

(72) Inventor: Andrew Jonathan Mound, Atlanta, GA (US)

(73) Assignee: Scientific Games International, Inc., Newark, DE (US)

( * ) Notice: Subject to any disclaimer, the term of this patent is extended or adjusted under 35 U.S.C. 154(b) by 53 days.

This patent is subject to a terminal disclaimer.

(21) Appl. No.: 14/949,096

(22) Filed: Nov. 23, 2015

(65) Prior Publication Data

US 2016/0155294 A1 Jun. 2, 2016

Related U.S. Application Data

(60) Provisional application No. 62/085,895, filed on Dec. 1, 2014.

(51) Int. Cl.
*A63F 9/24* (2006.01)
*A63F 13/00* (2014.01)
(Continued)

(52) U.S. Cl.
CPC .......... *G07F 17/3241* (2013.01); *A63F 13/85* (2014.09); *G06Q 20/3278* (2013.01);
(Continued)

(58) Field of Classification Search
CPC .............. A63F 13/216; A63F 2300/205; A63F 2300/306; A63F 2300/5573
See application file for complete search history.

(56) References Cited

U.S. PATENT DOCUMENTS 9,208,652 B2 12/2015 Aligizakis et al.
2002/0082921 A1 6/2002 Rankin
(Continued)

FOREIGN PATENT DOCUMENTS

WO WO 2014/179323 A1 11/2014

OTHER PUBLICATIONS

International Search Report & Written Opinion, dated Feb. 10, 2016.
(Continued)

*Primary Examiner* — Kevin Y Kim
(74) *Attorney, Agent, or Firm* — Dority & Manning, P.A.

(57) ABSTRACT

A system and method are provided wherein players become eligible to compete in a game show. Authorized communication-enabled locations are configured with a transmitter device that broadcasts an ID signal unique to the location or a receiver that receives an ID signal unique to a particular player. The players are provided with capability to receive the unique ID signals emitted by the transmitter devices, or to broadcast the ID signal unique to the player for receipt by the receiver in the locations. A game server receives a transmission that includes at least part of one of the ID unique signals, thereby identifying all of the players and their respective communication-enabled location. The game server randomly selects contestants for a game show from all of the players in the communication-enabled locations. A personalized message is provided to the players in the communication-enabled locations informing them of the game show and whether they were randomly selected to compete in the game show.

18 Claims, 5 Drawing Sheets

(51) Int. Cl.

| | | |
|---|---|---|
| *G06F 17/00* | (2006.01) | |
| *G06F 19/00* | (2011.01) | |
| *G07F 17/32* | (2006.01) | |
| *A63F 13/85* | (2014.01) | |
| *H04L 29/06* | (2006.01) | |
| *H04L 29/08* | (2006.01) | |
| *G06Q 20/32* | (2012.01) | |
| *H04W 4/00* | (2018.01) | |
| *H04W 4/04* | (2009.01) | |

(52) U.S. Cl.
CPC ........ *G07F 17/323* (2013.01); *G07F 17/3206* (2013.01); *G07F 17/329* (2013.01); *G07F 17/3239* (2013.01); *G07F 17/3262* (2013.01); *H04L 67/18* (2013.01); *H04L 67/22* (2013.01); *H04L 67/38* (2013.01); *H04W 4/008* (2013.01); *H04W 4/043* (2013.01)

(56) References Cited

U.S. PATENT DOCUMENTS

| | | | | |
|---|---|---|---|---|
| 2002/0090985 | A1* | 7/2002 | Tochner | A63F 13/12 463/1 |
| 2006/0025222 | A1 | 2/2006 | Sekine | |
| 2008/0146338 | A1* | 6/2008 | Bernard | A63F 13/00 463/42 |
| 2008/0146346 | A1* | 6/2008 | Hardy | G07F 17/32 463/42 |
| 2008/0305875 | A1* | 12/2008 | Heim | G07F 17/3293 463/42 |
| 2009/0113296 | A1* | 4/2009 | Lacy | G01C 21/3667 715/700 |
| 2010/0211431 | A1 | 8/2010 | Lutnick et al. | |
| 2011/0081958 | A1 | 4/2011 | Herrmann et al. | |
| 2011/0086693 | A1 | 4/2011 | Guziel et al. | |
| 2012/0094769 | A1 | 4/2012 | Nguyen et al. | |
| 2012/0214568 | A1 | 8/2012 | Herrmann | |
| 2013/0017884 | A1 | 1/2013 | Price et al. | |
| 2013/0065584 | A1 | 3/2013 | Lyon et al. | |
| 2013/0116032 | A1 | 5/2013 | Lutnick | |
| 2013/0157569 | A1* | 6/2013 | Torvmark | H04W 4/008 455/41.2 |
| 2014/0051507 | A1 | 2/2014 | Shapiro et al. | |
| 2014/0222574 | A1 | 8/2014 | Emigh et al. | |
| 2014/0370959 | A1 | 12/2014 | Yacenda | |

OTHER PUBLICATIONS

Co-Pending U.S. Appl. No. 14/948,833, filed Nov. 23, 2015.
Co-Pending U.S. Appl. No. 14/948,899, filed Nov. 23, 2015.
Co-Pending U.S. Appl. No. 14/948,958, filed Nov. 23, 2015.
Co-Pending U.S. Appl. No. 14/949,011, filed Nov. 23, 2015.
Co-Pending U.S. Appl. No. 14/949,054, filed Nov. 23, 2015.
Co-Pending U.S. Appl. No. 14/949,150, filed Nov. 23, 2015.
Co-Pending U.S. Appl. No. 14/859,999, filed Sep. 21, 2015.

* cited by examiner

SYSTEM AND METHOD FOR SELECTING GAME PLAYERS FROM MULTIPLE AUTHORIZED LOCATIONS TO COMPETE IN A GAME SHOW

RELATED APPLICATION

The present application claims priority to U.S. Provisional Patent Application No. 62/085,895, filed Dec. 1, 2014, the entire disclosure of which is incorporated herein by reference in its entirety for all purposes.

FIELD OF THE INVENTION

The present invention relates to conducting games, such as lottery games, wherein players that visit authorized locations may also be selected to compete in a game show.

BACKGROUND

Lottery games have become a time honored method of raising revenue for state and federal governments the world over. The success of these games, however, depends on continuous innovations that capture the interests of current players and draw new players to the games.

As with other consumers, lottery players are becoming more tech savvy, and are interested in conducting various gaming aspects via electronic devices, such as smart phones. The gaming industry is appreciative of this fact, and is seeking ways to integrate games and gaming-related functions into the rapidly developing mobile electronic communication age.

With conventional systems and methods, authorized retail vendors within a lottery jurisdiction are the primary means of lottery ticket sales and distribution. This relationship has been beneficial to the vendors in that lottery players also tend to purchase additional goods in the retail establishment. The gaming authority (e.g., a state or other governmental lottery authority) benefits in that a wide and varied sales and distribution network is provided by the authorized retail establishments.

It is important that new innovations in the gaming industry, particularly with respect to electronic gaming via smart phones or other portable mobile devices, attempt to preserve this mutually beneficial relationship. This is of particular concern to the retail vendors as electronic and on-line lottery ticket sales are growing in acceptance and popularity, and could potentially decrease lottery player traffic to the retail establishments.

The lottery industry is thus continuously seeking new and creative gaming scenarios that provide increased entertainment value to players, entice new players, and expand play of lottery games into the smart electronic communication age while at the same time maintaining or increasing lottery player foot traffic to the conventional ticket sales retail establishments

SUMMARY OF THE INVENTION

Objects and advantages of the invention will be set forth in part in the following description, or may be obvious from the description, or may be learned through practice of the invention.

In particular embodiments, a system and method are provided wherein players registered with a gaming authority, such as a lottery authority in a given lottery jurisdiction, become eligible for selection as a contestant in a game show.

A plurality of physical locations, such as a retail store, convenience store, pub, restaurant, and so forth, are authorized by the gaming authority as communication-enabled locations and are configured with a transmitter device, such as a BTLE (Bluetooth Low Energy) beacon, that broadcasts an ID signal unique to the communication-enabled location or a receiver that receives an ID signal unique to a particular player that visits the location. The identity and location of the communication-enabled locations are published to the players, for example via an electronic map at a website accessible by the players.

The players are provided with the capability to receive the unique ID signals emitted by the transmitter devices within the communication-enabled locations on a mobile smart device, or to broadcast the ID signal unique to the player for receipt by the receiver in the communication-enabled locations.

A game server is common to the communication-enabled locations, wherein for each player in one of the communication-enabled locations, the game server receives a transmission that includes at least part of the ID signal unique to the respective communication-enabled location or the ID signal unique to the player. The game server is thereby able to identify all of the players and their respective communication-enabled location.

The game server randomly selects contestants for a game show from all of the players in the communication-enabled locations. A personalized message is generated and sent to the players in the communication-enabled locations that informs the respective players of the game show and whether they were selected to compete in the game show.

The game show is conducted with game consoles in the communication-enabled locations configured in communication with the game server, wherein players from different locations compete against each other via the game consoles.

BRIEF DESCRIPTION OF THE DRAWINGS

A full and enabling description of the present invention is provided herein, with reference to particular embodiments depicted in the attached drawings and described below.

FIG. 6 is a screen shot of a web page displaying a plurality of authorized communication-enabled locations, as well as the particular time and game show the location will participate in.

DETAILED DESCRIPTION

Reference will now be made in detail to embodiments of the inventive methods and systems, one or more examples of which are illustrated in the drawings. Each embodiment is presented by way of explanation of the invention, and not as a limitation of the invention. For example, features illustrated or described as part of one embodiment may be used with another embodiment to yield still a further embodiment. It is intended that the present invention include these and other modifications and variations as come within the scope and spirit of the invention.

In general, the present disclosure is directed to computer and communication device-implemented methods and systems for conducting aspects of a game, such as a lottery game, at remote locations, wherein players visit the locations to conduct the gaming activities. For sake of example only, the following discussion relates to embodiments of the invention drawn to lottery primary games, bonus games, and second chance games sponsored by state or other jurisdictional lottery authorities. It should be appreciated, however, that the system and method are just as applicable to gaming activities linked to any manner of other gaming authority, such as games conducted within a gaming establishment (e.g., a casino) for patrons of such establishment, or electronic games conducted via an electronic network, such as the internet, for authorized players.

A concept of the present disclosure is that players become eligible for selection (e.g., by random drawing) to participate in a game show. It should be appreciated that the particular type of game show, number of contestants, rules of the game, and so forth, are not limiting features, and that the game shows described herein are for purposes of example only.

Another concept is that the players are registered with a gaming authority such that the identity of the players is known to the authority and stored in a database. For example, in one embodiment, the players are lottery game players and have a player's account with the lottery authority wherein various lottery-related activities and functions are available to the player, such as purchasing tickets, collecting loyalty points, participating in second chance games, checking ticket status, redeeming points or awards, and so forth. This account can be assigned a unique identification code that may be entered by the player for performing lottery-related activities at the communication-enabled locations.

Figure 1:
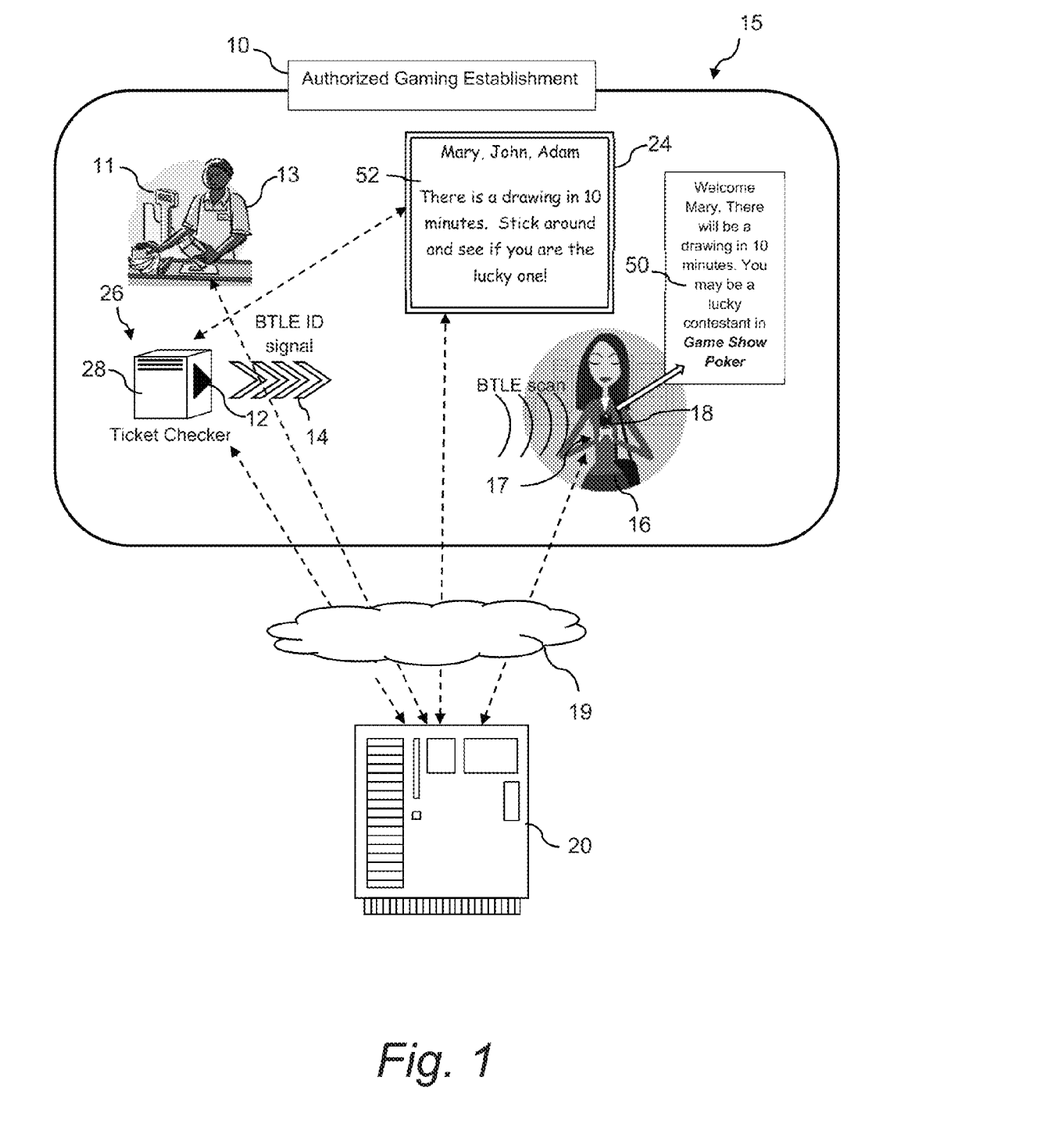
FIG. 1 is a diagram illustration of a system and method for conducting aspects of the present invention wherein a player visits a communication-enabled location and becomes eligible for selection as a game show contestant.

FIG. 1 is a diagram illustration of a system and method 15 in accordance with an embodiment of the invention. An establishment or location 10, such as a retail store, convenience store, pub, restaurant, or the like, is authorized by a lottery jurisdiction to carry out lottery activities, such as the sale of instant scratch-off tickets via a clerk 13, or terminal based tickets for draw games such as Powerball™ issued from a lottery terminal 11. The lottery jurisdiction may be a state lottery authority, such as the Pennsylvania Lottery Authority, or any other governmental jurisdictional authority. A separate game provider may be partnered with the lottery jurisdiction to provide certain control, implementation, and logistical functions of the game. It should be appreciated that the type of location 10 or lottery jurisdiction entities are not limiting factors of the invention.

A plurality of the locations 10 within the lottery jurisdiction are each equipped with a communication device, such as a transmitter device 12 or scanner/receiver device 17 (FIG. 3), wherein an intermittently transmitted data packet or signal 14 is transmitted and received within a limited range within the location 10. In this regard, the locations 10 are referred to as communication-enabled locations. It has been found that Bluetooth Low Energy (BTLE) technology is particularly well-suited for use with the present subject matter. For example, the transmitter devices 12 may be BTLE beacons and the scanner/receiver devices 17 may be any component configured to receive and recognize the BTLE formatted signal 14.

BTLE devices are well-known to those skilled in the art, and a detailed explanation of their function and operation is not necessary for an understanding and appreciation of the present invention. Briefly, BTLE beacons are a class of low-energy, low-cost radio transmitters that can notify mobile smart devices 18 (e.g., iOS 7 smart phones) running BTLE applications of their presence, which in turn enables the smart device 18 to perform certain actions when in close proximity to the beacon. These devices are often referred to as "iBeacons", which is the name Apple chose for its implementation of the BTLE technology. Each BTLE beacon broadcasts a unique identification signal 14 using the BTLE standard format. These signals 14 are also known as iBeacon "advertisements." The mobile smart device 18 runs a background application that enables the device to scan for and receive the signals 14 within transmitting range of the BTLE beacons. The mobile smart device 18 will automatically "react" to the received signal 14 and may start other BTLE-enabled applications for various purposes, including communication with a central server 20.

A typical use of BTLE technology is relatively precise indoor geo-location ("micro-location"). A BTLE-enabled application on the mobile smart device is notified when the device moves in an out of range of the BTLE beacon, and thus is able to determine distance to the transmitter. The exact geo-location of the transmitter is known, and thus the exact location of the mobile smart device is calculated based on relative distance from the transmitter as a function of signal strength. With this location information, a server in communication with the smart device can generate a message to the person telling them, for example, that a number of close-by items in the store are on sale, and so forth.

It should be appreciated that the present systems and methods are not limited to BTLE technology. Other transmitter/receiver technologies may also be utilized for practice of the invention. For example, Near Field Communication (NFC) implementations may be utilized. In another embodiment, Radio Frequency Identification (RFID) technology may be used. Other communication technologies are also within the scope and spirit of the invention.

Referring again to FIG. 1, a patron 16 is depicted within the authorized gaming location 10, which may be a grocery store or convenience store authorized by a respective lottery jurisdiction to conduct lottery related activities within the lottery jurisdiction. In this particular embodiment, the location 10 has one or more transmitter devices 12, such as BTLE beacons, at strategic locations to transmit a BTLE ID signal 14 that is unique to the particular transmitter (and thus unique to the location 10) to areas of the location 10 in which the patrons 16 are likely to pass or visit. Any number and pattern of the transmitters 12 may be deployed to ensure select or complete coverage of the public areas of the location. In this regard, the location 10 is considered as "communication-enabled." The transmitters 12 may be hidden from view or disguised as some other component, e.g., an air freshener or camera. In particular embodiments, the transmitter 12 is incorporated with another functional component 26 of the overall lottery or gaming system. For example, the location 10 may provide an electronic ticket checker 28 wherein lottery game players can scan a previously purchased ticket to check whether or not such ticket is entitled to a prize. The transmitter 12 may be configured on or within the ticket checker 28.

As discussed above, the beacon or transmitter device 12 (referred to generically as "transmitter" herein) may function in "transmit" or "peripheral" mode wherein it intermittently broadcasts its unique ID signal 14. If the transmitter 12 is a BTLE beacon, then the signal 14 is transmitted using the BTLE standard format. The signal 14 is unique to the transmitter 12. Thus, by maintaining a library of the transmitter devices 12 (and their unique ID signals 14) and their respective locations, a game server 20 can readily determine which transmitters 12 are within each communication-enabled location 10.

The patron 16 within the location 10 may also be a game player, in which the player 16 has on their person a mobile smart device 18, such as a smart phone, tablet, PDA, or other network-enabled device (all referred to herein generically as a "mobile smart device"). The mobile smart device 18 runs a low-power background application previously downloaded by the player 16 from a source (e.g. a website) maintained by the lottery authority or lottery game provider. This application allows the mobile smart device 18 to function as a scanner or receiver 17 in a scan or "central" mode to receive the signals 14 if within range of the transmitters 12. Once the mobile smart device 18 detects a signal 14 from the transmitter 12, certain other application functions are initiated. For example, the mobile smart device 18 will automatically "react" to the received signal 14 and start other BTLE-enabled applications.

The location 10 may be equipped with any manner of additional functional components 26 to facilitate the present purposes. For example, FIG. 1 depicts a large screen audio-video display 24 that may be used to inform players 16 via personalized messages of various lottery functions, including greetings and information regarding the game show to be conducted at the location 10, as well as instructions to the player as to any additional activity they may need to perform at the location before being eligible for selection as a contestant in the game show. The display 24 may be controlled directly by the game server 20, or via another functional component 26 that is in communication with the server 20, such as the ticket checker 28.

FIG. 1 depicts the central game server 20 that is common to the communication-enabled locations 10. The term "game server" is used herein to encompass any configuration of computer hardware and software that is maintained by a lottery authority or game provider to carry out the functionalities of the present invention, as well as any manner of additional lottery functions. It should be readily appreciated that the server 20 may include an integrated server, or any manner of periphery server or other hardware structure. While the player 16 is in one of the locations 10 and within operating range of the BTLE transmitter and receiver components, the game server 20 is simultaneously in communication with any one or combination of the functional components 26 (e.g., ticket checker 28, display 24) and the player's mobile smart device 18, as described in greater detail below.

The game server 20 is typically remote from the location 10, and is in communication with the plurality of the locations 10 via a suitable secure communication network 19, which may include any manner of wide area network, wireless internet, or cloud computing.

The game server 20 may be a single networked computer, or a series of interconnected computers having access to the communications network via a gateway or other known networking system. Generally, the game server 20 is configured to communicate with, manage, execute and control individual lottery terminal units within the lottery jurisdiction, including the lottery terminals 13 within the transmitter-enabled locations 10, and to interface with the network enabled mobile smart devices 18 of the players 16 that enter the locations 10. The game server 20 may include a memory for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 100.

The game server 20 may be directly or indirectly connected through the I/O bus to any manner of peripheral devices such as storage devices, wireless adaptors, printers, and the like. In addition, a database (DB) may be communicatively connected to the game server 20 and provide a data repository for the storage and correlation of information gathered from the individual components 28, 24, 18. The information stored within the database may be information relating to individual players, games, or game card specific information. For the present purposes, the database may also store the value assigned to each of the losing game tickets from the primary lottery.

It should be appreciated that embodiments of the methods and systems disclosed herein may be executed by one or more suitable networked lottery gaming components within a plurality of the locations 10, as well as a remote central computer system. Such system(s) may comprise one or more computing devices adapted to perform one or more embodiments of the methods disclosed herein. Such gaming systems and computing devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

As mentioned above, aspects of the present systems and methods rely on the transmission of data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network may comprise any number and/or combination of hardwired, wireless, or other communication links.

Figure 2:
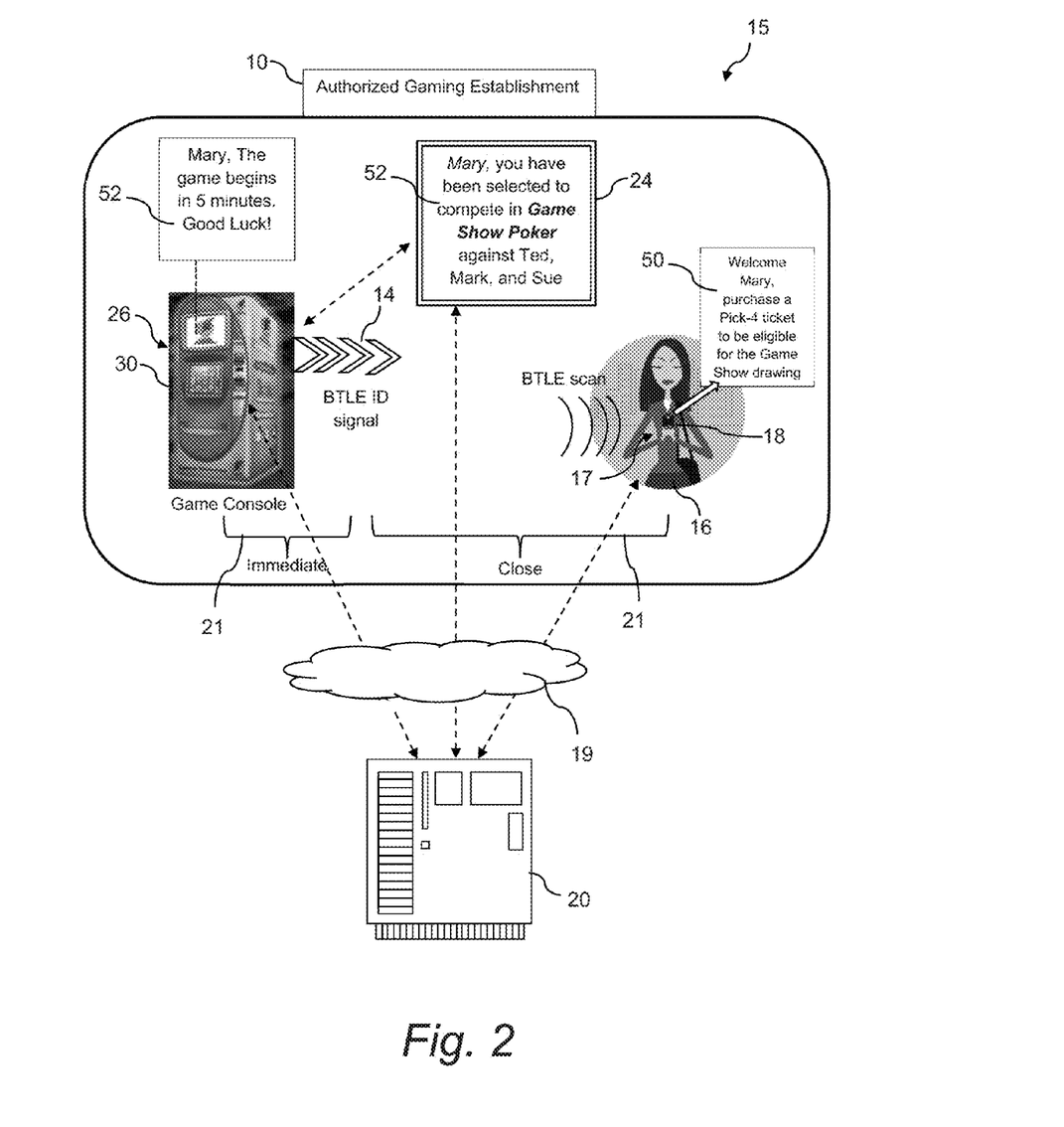
FIG. 2 is a diagram illustration of an alternate embodiment of a system and method wherein a player visits a communication-enabled location and becomes eligible for selection as a game show contestant.

In FIG. 1, the player ("Mary") becomes eligible for selection as a contestant in a game show simply for visiting the location 10 and making the communication connection with the server 20 as described herein. The player 16 will participate in the game show via the game console 30 (FIG. 2). A personalized message 50 may be transmitted to the player 16 informing the player of their selection, or providing other information related to the game show. The message 50 in the illustrated embodiment is sent to the player's mobile smart device 18. The message 50 could also be transmitted to the screen 24 or any other functional component 26 in the location, such as a game console 30 (FIG. 2).

FIG. 1 also depicts a second personalized message 52 directed to the player 16 via the screen 24 informing the player that there will soon be a drawing to selects contestants for the game show, and encouraging the player 16 to remain at the location 10 for the drawing results.

FIG. 2 depicts a functional component 26 is the form of a game console 30 having a dedicated display and an input device, such as a ticket scanner, keyboard, touchscreen, or the like. This console 30 may have the transmitter 12 configured internally therein, and thus functions as the BTLE beacon in transmit or peripheral mode, while the player's mobile smart device 18 is in scan or central mode. The console 30 has its own processor and control system in communication with the server 20 via the communications network 19 for interfacing with the player 16 so that the player can play a game, access their player account, or conduct any other manner of game-related activities. The console 30 may also be in communication with the external display 24, as discussed above, to convey the personalized messages 50, 52 from the server 20 to the player 16 informing the player of the game show particulars (e.g., time of the next contestant drawing, results of the drawing, time of the next game show, additional required activities, etc.).

Figure 3:
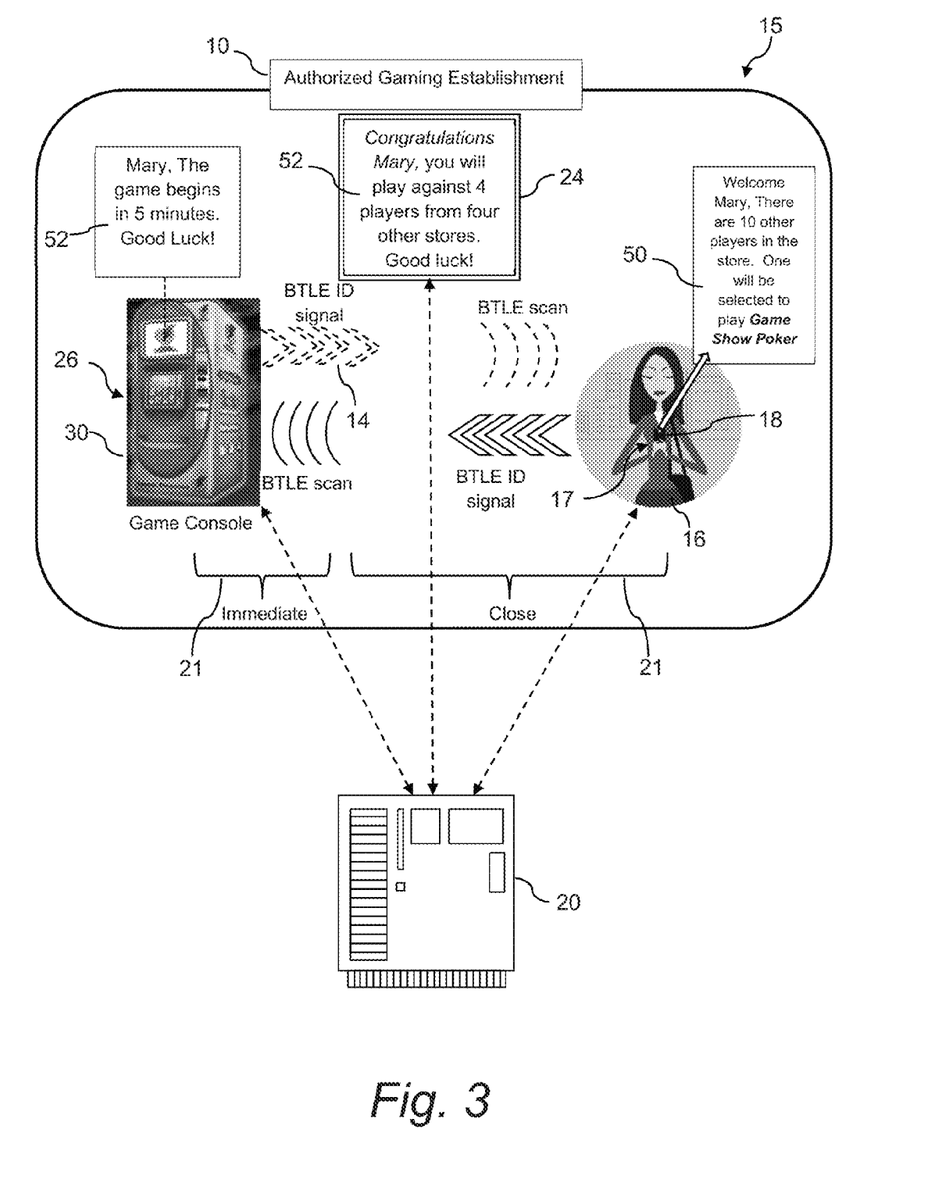
FIG. 3 is a diagram illustration of another embodiment of a system and method wherein a player visits a communication-enabled location and becomes eligible for selection as a game show contestant.

In the embodiment of FIG. 2, the player 16 is required to complete a lottery-related activity at the location 10 before being eligible for the contestant drawing. For example, the player may be required to purchase a lottery ticket at the console 30 before being entered in the drawing. This activity is verified by the server 20 when the player 16 enters their account code at the console 30 before purchasing the ticket or performing some other required activity. The game console 30 may display a personalized message acknowledging the activity, as depicted in FIG. 3. A second personalized message 52 may be displayed on the screen 24 informing the player ("Mary") that they were selected in the drawing and will compete against other named contestants from other locations 10. The personalized messages 50, 52 may also be conveyed to the player 16 via the console's own dedicated screen, or via the player's mobile smart device 18.

In another embodiment, the player may be required to perform a non-gaming activity in the location 10 before being entered into the contestant drawing. For example, the player may be required to purchase an item at the location 10, or enter a code that is strategically provided somewhere in the location 10 to encourage the player to view merchandise and hopefully make a purchase.

In the embodiment of FIG. 3, the player 16 is presented with a personalized message 50 via their mobile smart device 18 informing her that there are other players in the same location 10 in the drawing for selection of a game show contestant. As discussed herein, the game server 20 is able to identity such players and their presence in particular locations 10. In the second personalized message 52, the player 16 is informed that she was selected to be the game show contestant for the location 10, and that she will compete against four players from four different locations 10. As the player 16 approaches the game console 30, other personalized messages may be generated and transmitted to the player 16 via the console 30.

Referring again to the embodiment depicted in FIG. 1, the game server 20 is in communication with the lottery component 26 that incorporates the transmitter 12 for controlling the functions of the component 26, such as the scanning and verifying capability of the ticket checker 28. This communication path may also allow the server 20 to control and/or monitor the operating status of the transmitter 12. In certain embodiments, the transmitter 12 may be programmable, for example to change the unique ID signal 14 emitted by the transmitter 12, and this function may be controlled by the game server 20. In other embodiments, such as BTLE beacons, the transmitter 12 is not programmable, but the game server 20 may monitor the operating status of the device. The functional component 26 may, in turn, have a dedicated display or be in communication with the large screen display 24, by way of which the game server 20 controls the display 24. Alternatively, the server 20 may be in direct communication with the display 24 if the display is also equipped with a processor.

In the configuration of FIG. 1, the player's mobile smart device 18 is in scan or central mode and detects the unique ID signal 14 from the transmitter 12. At this point, an application may be started to cause the device 18 to communicate with the game server 20 and relay at least the ID content of the signal 14 to the server 20. The application also identifies the player 16 to the server 20. For example, a unique player account number or other unique player ID code is transmitted to the server 20 along with the content of signal 14. With this information, the server 20 can access the player's account and is thus aware of the identity of the player 16 that is at the particular communication-enabled location 10. The activities performed at the location 10 are verifiable by the server 20 because they are performed on functional components 26 in communication with the server 20. At this point, the server 20 can issue any manner of personalized messages 50, 52 to the player 16 via, for example, the display 24, other functional component 26 (e.g., the console 30), or directly to the player's mobile smart device 18, as depicted in FIG. 1.

FIG. 2 also depicts that a distance 21 from the player 16 to the transmitter device (within the console 30) can be accurately calculated as a function of signal strength from the signal 14 received by the player's mobile smart device 18. The signal strength increases as the player 16 gets closer to the transmitter. Through calibration of the BTLE-enabled application running on the player's device 18 (or on the receiver in the location 10 if the BTLE beacon is carried by the player 16) for distance as a function of signal strength, the distance 21 between the player 16 and console 30 is accurately determined. This function may be useful for embodiments wherein the distance 21 causes certain game functions to be initiated at the console 30, for example transmission of certain personalized messages as the players 16 get closer to the console 30. The distance 21 can be broken down into segments, such as "close" or "immediate", wherein certain actions are initiated as the player 16 moves from one segment into the other segment.

With respect to FIG. 1, because the distance between the ticket checker 28 (with transmitter 12) and the console 30 is fixed and known, the distance between the console 30 and the player 16 is readily calculated by inclusion of the distance between the console 30 and the transmitter 12 in the calculation.

FIG. 3 depicts an embodiment wherein the functions of the game console 30 and the player's mobile smart device 18 are switched. In this embodiment, the console 30 is configured with BTLE scan capability, and is in communication with the server 20. The player's device 18 is configured as a transmitter or broadcast device that transmits an ID signal unique to the particular player. For example, the device 18 may have a BTLE beacon configured therewith having a unique ID signal that is associated with a particular player. Alternatively, the player may simply carry a dedicated broadcast device, such as a BTLE beacon in the form a keychain ornament, dongle, or the like. In this embodiment, the mobile smart device 18 may also be in communication with the server 20. The console 30 is in a generally constant scan mode and will detect the unique BTLE signal 14 emitted from a player's device 18 (or separate BTLE beacon) within range and transmit the ID information from the signal 14 to the server 20. The unique ID signal 14 is correlated to a specific person by the server 20, which then generates and transmits the personalized message 22 to the game console 30 and/or to the display 24. The display 24 may be spaced from the console 30, and the message 22 sent to the display 24 may be triggered when the person is within the "close" distance segment. The message 22 on the display is meant to catch the player's attention and invite the player 16 to approach the console 30. When the player 16 enters the "immediate" distance segment, the console 30 may transmit another personalized message 22 that invites the player 16 to play a game or conduct other game activities on the console 30.

FIG. 3 also depicts (in dashed lines) that the player's device 18 and the console 30 may switch between scan mode and transmit mode so as to carry out any of the functions discussed above.

Figure 4:
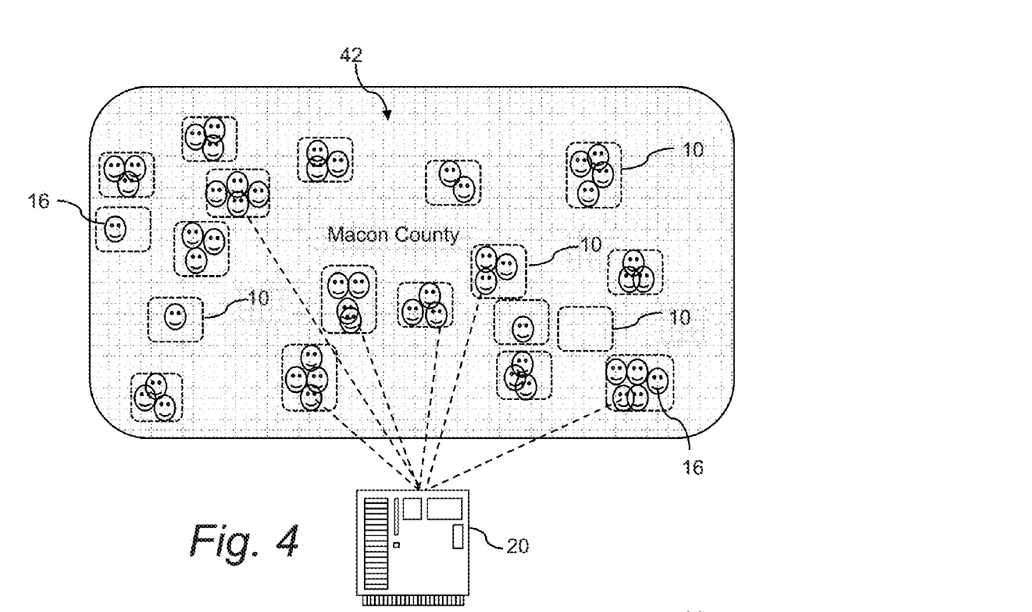
FIG. 4 is a diagram illustration of a gaming server in communication with a plurality of communication-enabled locations within a gaming jurisdiction.

FIG. 4 schematically depicts a partial lottery jurisdiction 42, which may be a county within a larger jurisdiction, such as a state. All of the authorized BTLE-enabled locations 10 are depicted in the display, which may be a map of the jurisdictional area with the locations indicated at their geographic location. As discussed above, BTLE-enabled players 16 that visit the locations 10 are uniquely identified by the server 20. Thus, at any given time, the server 20 is aware of not only the number of players 16 in any give location 10, but also the identity of such players 16. For example, FIG. 4 depicts certain locations 10 with no players, while other locations 10 have one, two, three, or four players. The ability to know exactly how many players 16 are within the plurality of different locations 10, as well as the identity of such players 16, enables unique game functions. For example, the server 20 can determine how many players 16 are present at any one time that make up the pool of possible game show contestants, and conduct the drawings accordingly to select the proper number of contestants from the desired number of locations 10. Personalized messages 50, 52 are able to be generated to all of the potential contestants, as set forth above, which may include information such as time of the drawings for contestants, number of contestants to be drawn, number of players 16 in a drawing for each respective location 10, number of contestants selected from other locations 10, and so forth.

Figure 5:
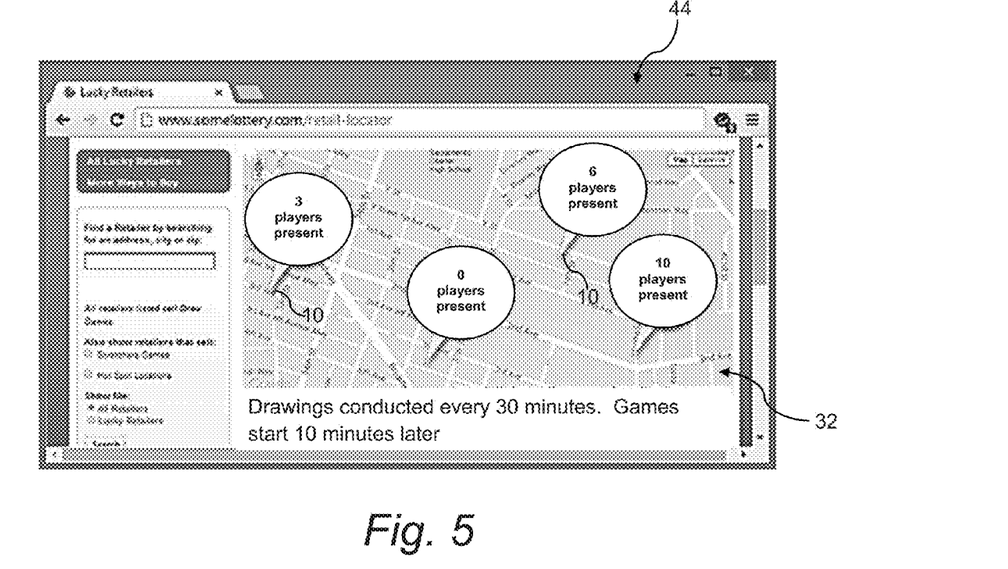
FIG. 5 is a screen shot of a web page displaying a plurality of authorized communication-enabled locations, as well as the number of eligible players at the location at a given time.

FIG. 5 is a screen shot of a functional display that may be provided to players 16 in the form of an electronic map 32 that gives the location of the BTLE-enabled locations 10 within a given jurisdiction (or geographic region of the jurisdiction). Thus, at any desired time, the players can access the website and determine if a participating location 10 is close by. FIG. 5 also depicts an option wherein the number of players 16 at each location at any given time is presented to the players 16. With this information, players 16 can pick and choose the locations 10 they wish to visit to improve their chances of being selected in a drawing.

Figure 6:
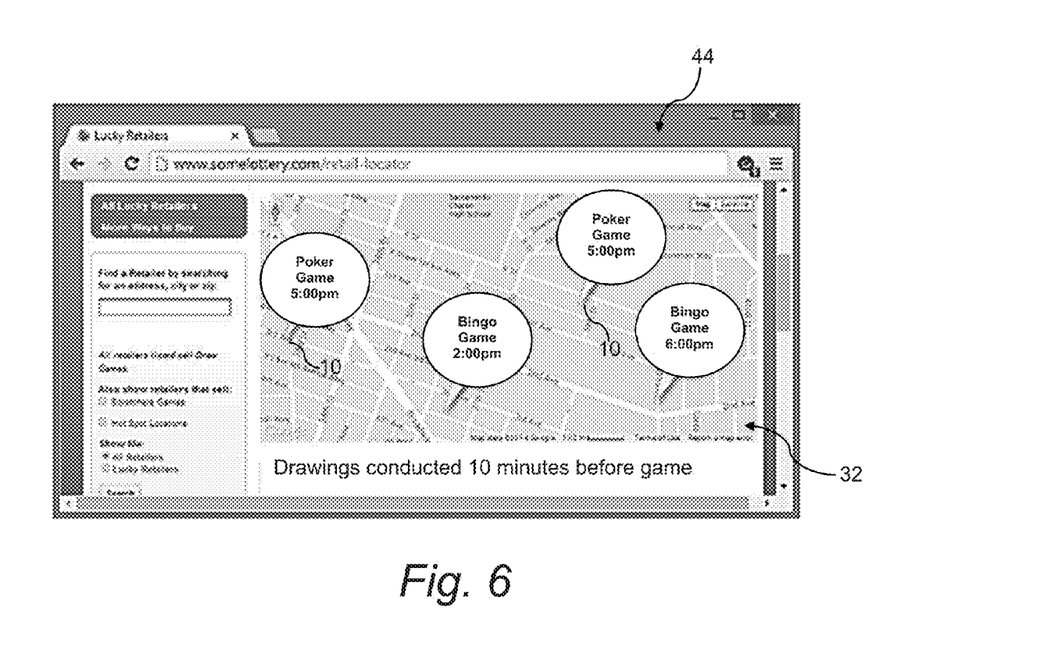

The screen shot in FIG. 6 is similar to that of FIG. 5 in that it provides the geographic location of the participating BTLE-enabled locations 10 within the geographic area. Each location is also identified with the type of game show that will be conducted at the location 10, as well as the time. In this regard, the players can pick and choose which game show they would prefer to be a contestant in. FIG. 6 thus depicts that different game shows can be conducted at different times and with different participating locations 10. In other words, for the Poker Game Show scheduled for 5:00 pm, two of the locations will participate (not all of the locations 10).

The various system 15 configurations discussed above with respect to FIGS. 1 through 6 enable method embodiments in accordance with aspects of the invention. For example, a method is provided wherein players registered with a gaming authority, such as a lottery authority in a lottery jurisdiction, become eligible for selection as a contestant in a game show wherein the players compete against other players. A plurality of physical locations, such as a retail store, convenience store, pub, restaurant, and so forth, are authorized by the gaming authority as communication-enabled locations and are configured with a transmitter device that broadcasts an ID signal unique to the communication-enabled location or a receiver that receives an ID signal unique to a particular player that visits the location. The identity and location of the communication-enabled locations are published to the players, for example via an electronic map at a website accessible by the players.

The players are provided with the capability to receive the unique ID signals emitted by the transmitter devices within the communication-enabled locations on a mobile smart device, or to broadcast the ID signal unique to the player for receipt by the receiver in the communication-enabled locations.

A game server is common to the communication-enabled locations, wherein for each player in one of the communication-enabled locations, the game server receives a transmission that includes at least part of the ID signal unique to the respective communication-enabled location or the ID signal unique to the player. The game server is thereby able to identify all of the players and their respective communication-enabled location.

The game server randomly selects contestants for a game show from all of the players in the communication-enabled locations. A personalized message is generated and sent to the players in the communication-enabled locations that informs the respective players of the game show and whether they were selected to compete in the game show.

The game show is conducted with game consoles in the communication-enabled locations configured in communication with the game server, wherein players from different locations compete against each other via the game consoles.

In one embodiment, the contestants are selected from different communication-enabled locations and compete against each other via the game consoles at their respective locations. More than one contestant may be selected from the communication-enabled locations. It is not necessary that a contestant is selected from each location. Alternatively, all of the communication-enabled locations may participate in the same game show. In another embodiment, the locations are divided into groups, with the different groups participating in different game shows.

In some embodiments, the players are lottery game players within a lottery jurisdiction and have a respective player's account maintained by the lottery jurisdiction. Thus, the players are registered with the gaming authority by way of their account and may become eligible for selection as a contestant in the game show upon visiting the respective communication-enabled location without further requirements placed on the player. In other embodiments, the players may be required to satisfy an additional activity at the communication-enabled location prior to becoming eligible for selection as a contestant in the game show. This additional activity may be, for example, a lottery game-related activity at the locations, such as purchase of a ticket, redemption of a prize, checking status of ticket, and so forth. Functional components may be provided in the communication-enabled locations to allow the players to perform the game-related activities, the functional components including any combination of a ticket checker, interactive game console, audio-video display, and game terminal.

In certain embodiments, the identity and location of the communication-enabled locations are published to the players via an electronic map provided on a website. This map may also notify the players of scheduled game show times at each communication-enabled location, the number of other players present at each of the communication-enabled locations that are eligible for selection as a game show contestant, different types of game shows available at different locations, and so forth.

For communication purposes, in certain embodiments, the players are provided one or more of: an application for download to a mobile smart device carried by the player, the application enabling receipt and recognition by the mobile smart device of the unique ID signals emitted by the transmitter devices within the communication-enabled locations; an application for download to a mobile smart device that causes the mobile smart device to transmit the ID signal unique to the player for receipt by the receiver in the communication-enabled locations; or a personal broadcast device that broadcasts the ID signal unique to the player. The game server may be in secure communication with one or all of: the player's mobile smart device; the receiver at the communication-enabled location; or a functional component at the communication-enabled location for communicating with the player.

The transmitter device may be a Bluetooth Low Energy (BTLE) beacon that emits a unique BTLE ID signal, and the application downloaded to the player's mobile smart device receives the BTLE ID signal and transmits all or a portion of the BTLE ID signal to the game server. The BTLE beacon can be incorporated with a functional component display in the BTLE-enabled location, the game server communicating the personalized message to the player via the display. The functional component may be one of a ticket checker device that scans game tickets presented by the player and communicates with the game server, or is the game console wherein the player can interactively engage with the game server and the other game show contestants.

It should be appreciated by those skilled in the art that various modifications and variations may be made present invention without departing from the scope and spirit of the invention. It is intended that the present invention include such modifications and variations as come within the scope of the appended claims.

What is claimed is:

1. A method wherein players registered with a gaming authority become eligible for selection as a contestant in a game show, the method comprising:

designating a plurality of set physical locations as authorized communication-enabled locations, wherein each physical location is a knowing and pre-authorized participant in the method and is configured with a transmitter device that is located at the location and broadcasts an ID signal within a limited range that encompasses public areas of the location accessible to the players, the ID signal unique to the communication-enabled location, or each location configured with a receiver that receives an ID signal unique to a particular player in the public areas of the location;

providing the identity and location of all of the participating communication-enabled locations to all of the players before the players select one of the communication-enabled locations, wherein each player is free to choose any one of the participating locations to participate in the method regardless of the player's actual location;

providing the players with capability to receive the unique ID signals emitted by the transmitter devices within the communication-enabled locations on a mobile smart device, or to broadcast the ID signal unique to the player for receipt by the receiver in the communication-enabled locations;

providing a game server that is common to the communication-enabled locations, wherein for each of the players in one of the communication-enabled locations, the game server receives a transmission that includes at least part of the ID signal unique to the respective communication-enabled location or the ID signal unique to the player, the game server thereby identifying all of the players and their respective communication-enabled location;

the game server randomly selecting multiple contestants for a game show from all of the players in the communication-enabled locations, wherein the multiple contestants compete against each other in the game show;

providing a personalized message to the players in the communication-enabled locations informing the player of the game show and whether they were randomly selected to compete in the game show;

conducting the game show with game consoles in the communication-enabled locations configured in communication with the game server; and wherein the contestants are selected from different communication-enabled locations and compete against each other via the game consoles.

2. The method as in claim 1, wherein more than one contestant is selected from at least one of the communication-enabled locations.

3. The method as in claim 1, wherein the players are lottery game players within a lottery jurisdiction, the players having a respective player's account maintained by the lottery jurisdiction.

4. The method as in claim 3, wherein the players become eligible for selection as a contestant in the game show upon visiting the respective communication-enabled location without further requirements placed on the player.

5. The method as in claim 3, wherein the players are required to satisfy an additional activity at the communication-enabled location prior to becoming eligible for selection as a contestant in the game show.

6. The method as in claim 5, wherein the additional activity is a lottery game-related activity.

7. The method as in claim 6, wherein functional components are provided in the communication-enabled locations to allow the players to perform the game-related activities, the functional components including any combination of a ticket checker, interactive game console, audio-video display, and game terminal, and wherein the transmitter or the receiver is configured in one of the functional components located in the communication-enabled location.

8. The method as in claim 1, wherein the identity and location of the communication-enabled locations are published to the players via an electronic map provided on a website.

9. The method as in claim 8, wherein the electronic map notifies the players of scheduled game show times at each communication-enabled location.

10. The method as in claim 9, wherein the electronic map notifies the players of the number of other players present at each of the communication-enabled locations.

11. The method as in claim 1, wherein all of the communication-enabled locations participate in the same game show.

12. The method as in claim 1, where the communication-enabled locations are divided into groups, with the different groups participating in different game shows.

13. The method as in claim 1, wherein the players are provided one or more of: (1) an application for download to a mobile smart device carried by the player, the application enabling receipt and recognition by the mobile smart device of the unique ID signals emitted by the transmitter devices within the communication-enabled locations; (2) an application for download to a mobile smart device that causes the mobile smart device to transmit the ID signal unique to the player for receipt by the receiver in the communication-enabled locations; or (3) a personal broadcast device that broadcasts the ID signal unique to the player.

14. The method as in claim 13, wherein the game server is in secure communication with one or all of: the player's mobile smart device; the receiver at the communication-enabled location; or a functional component at the communication-enabled location for communicating with the player.

15. The method as in claim 13, wherein the transmitter device is a Bluetooth Low Energy (BTLE) beacon that emits a unique BTLE ID signal, and the application downloaded to the player's mobile smart device receives the BTLE ID signal and transmits all or a portion of the BTLE ID signal to the game server.

16. The method as in claim 15, wherein the BTLE beacon is incorporated with a functional component display in the BTLE-enabled location, the game server communicating the personalized message to the player via the display.

17. The method as in claim 16, wherein the functional component is one of a ticket checker device that scans game tickets presented by the player and communicates with the game server, or is the game console wherein the player can interactively engage with the game server and the other game show contestants.

18. The method as in claim 13, wherein the personalized message is provided to the player via the player's mobile smart device.

* * * * *